United States Patent
Ducellier et al.

(10) Patent No.: US 11,411,647 B2
(45) Date of Patent: Aug. 9, 2022

(54) COARSE POINTING ARRANGEMENT

(71) Applicant: COM DEV LTD., Mississauga (CA)

(72) Inventors: Thomas Ducellier, Ottawa (CA);
Sheng Hai Zheng, Kanata (CA); Brian MacKay, Ottawa (CA)

(73) Assignee: COM DEV LTD.

( * ) Notice: Subject to any disclaimer, the term of this patent is extended or adjusted under 35 U.S.C. 154(b) by 0 days.

(21) Appl. No.: 17/157,544

(22) Filed: Jan. 25, 2021

(65) Prior Publication Data

US 2021/0242939 A1 Aug. 5, 2021

Related U.S. Application Data

(60) Provisional application No. 62/968,345, filed on Jan. 31, 2020.

(51) Int. Cl.
| | |
|---|---|
| *H04B 10/00* | (2013.01) |
| *H04B 10/118* | (2013.01) |
| *G02B 23/02* | (2006.01) |
| *H04B 7/185* | (2006.01) |
| *B64G 1/10* | (2006.01) |

(52) U.S. Cl.
CPC ......... *H04B 10/118* (2013.01); *G02B 23/02* (2013.01); *H04B 7/18521* (2013.01); *B64G 1/1085* (2013.01)

(58) Field of Classification Search
CPC . H04B 10/118; H04B 10/112; H04B 10/1123; H04B 10/114; H04B 10/1143; H04B 10/1149; H04B 10/40; H04B 10/1125; H04B 10/1127; H04B 10/1129; G02B 23/02

USPC ....... 398/118, 119, 121, 122, 123, 124, 125, 398/127, 128, 129, 130, 131, 135, 136, 398/33, 38

See application file for complete search history.

(56) References Cited

U.S. PATENT DOCUMENTS

| | | | |
|---|---|---|---|
| 5,465,170 A * | 11/1995 | Arimoto | H04B 10/118 398/129 |
| 6,268,944 B1 | 7/2001 | Szapiel | |
| 6,462,846 B1 | 10/2002 | DeLong | |
| 6,535,314 B1 | 3/2003 | Mendenhall et al. | |

(Continued)

FOREIGN PATENT DOCUMENTS

| | | |
|---|---|---|
| DE | 202007012193 U1 | 1/2009 |
| EP | 2304512 B1 | 5/2014 |

(Continued)

OTHER PUBLICATIONS

Robinson et al., "High-Rate Laser Communications for Human Exploration and Science", Deep Space Gateway Science Workshop 2018, pp. 1 through 2.

(Continued)

*Primary Examiner* — Hanh Phan
(74) *Attorney, Agent, or Firm* — Fogg & Powers LLC (57) ABSTRACT

An apparatus for optical pointing is disclosed. The apparatus comprises a telescope, a transmission prism rotatably coupled to the telescope, and a rotatable mechanism operatively coupled to the telescope. The transmission prism is configured to rotate around a first rotation axis, and the rotatable mechanism is configured to rotate around a second rotation axis that is different than the first rotation axis.

20 Claims, 6 Drawing Sheets

(56) References Cited

U.S. PATENT DOCUMENTS

| | | |
|---|---|---|
| 7,236,299 B1 | 6/2007 | Smith |
| 8,400,700 B2 | 3/2013 | Adams et al. |
| 9,389,411 B1 | 7/2016 | Granger et al. |
| 9,723,386 B1 * | 8/2017 | Ni .................... H04Q 11/0066 |
| 10,495,839 B1 | 12/2019 | Carlson et al. |
| 10,527,493 B2 | 1/2020 | Pasternak |
| 2004/0179847 A1 | 9/2004 | Johnson et al. |
| 2006/0008238 A1 * | 1/2006 | Suzuki ................ H04B 10/118 |
| | | 385/147 |
| 2012/0138728 A1 | 6/2012 | Brunton et al. |
| 2014/0226968 A1 | 8/2014 | Cook |
| 2015/0309304 A1 | 10/2015 | Protz |

FOREIGN PATENT DOCUMENTS

| | | |
|---|---|---|
| EP | 3130955 A1 | 2/2017 |
| EP | 3564724 A1 | 11/2019 |
| WO | 2007143222 A2 | 12/2007 |
| WO | 2008048219 A2 | 4/2008 |
| WO | 2013092388 A1 | 6/2013 |
| WO | 2020127967 A2 | 6/2020 |

OTHER PUBLICATIONS

"MASCOT Variant for LEO Ring Constellations", Lincoln Laboratory, at least as early as Dec. 11, 2019, p. 1, Massachusetts Institute of Technology.

European Patent Office, "Extended European Search Report from EP Application No. 21554453.1", from Foreign Counterpart to U.S. Appl. No. 17/157,544, filed Jun. 4, 2021, pp. 1 through 8, Pubished: EP.

* cited by examiner

COARSE POINTING ARRANGEMENT

CROSS REFERENCE TO RELATED APPLICATION

This application claims the benefit of priority to U.S. Provisional Application No. 62/968,345, filed on Jan. 31, 2020, which is herein incorporated by reference.

BACKGROUND

Free space optical links, especially inter-satellite links or satellite-to-ground links, have optical link distances which typically range from hundreds to many thousands of kilometers, and beam angular sizes are extremely narrow (e.g., a few microradians at most). Accordingly, accurate pointing between terminals becomes a significant challenge.

Optical Inter-Satellite Link (OISL) systems generally comprise two levels of pointing arrangements: a coarse pointing mechanism enabling each terminal to find its communication partner, scanning a wide angular range with coarse resolution/accuracy; and a fine steering mechanism that compensates for mechanical disturbances (jitter) via a fast closed loop system, scanning a small angular range with extreme precision/accuracy.

A Coarse Pointing Assembly (CPA) can be done in reflection, such as through mirrors mounted on a two-dimensional (2D) gimbal, folding mirrors arranged in a coudé path, or galvanometers. In general, galvanometers are not suited to large size beams. Further, these reflection solutions disadvantageously tend to be of a large size in order to house all of the components.

Figure 1:
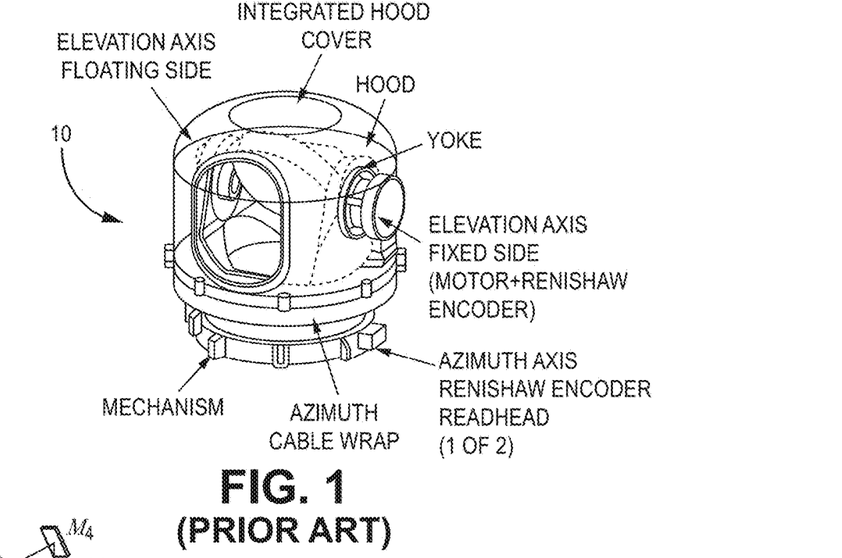
FIG. 1 illustrates a prior art reflective mirror-based Coarse Pointing Assembly (CPA) using a two-dimensional gimbal.

An example embodiment of a conventional CPA 10 with mirrors mounted on a 2D gimbal is shown in FIG. 1. The CPA 10 includes various mechanical and electrical components as depicted in FIG. 1.

Figure 2:
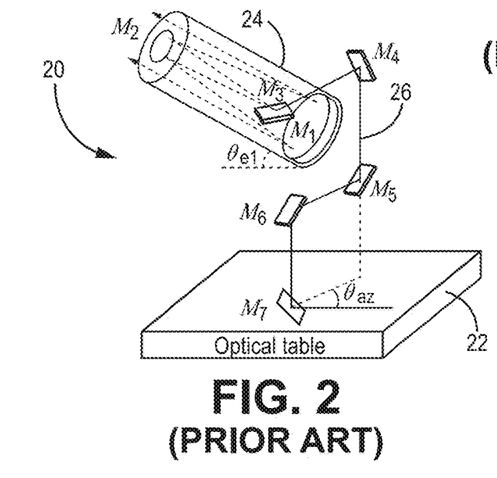
FIG. 2 illustrates a prior art reflective mirror-based CPA using a coudé path.

An example implementation of a conventional CPA 20 with folding mirrors arranged in a coudé path is shown in FIG. 2. The CPA 20 is mounted on an optical table 22 and enables free rotation of a telescope 24 around a folding optical path 26, which is provided by a set of mirrors.

In aircrafts, transmission pointing assemblies are typically accomplished through beam steering prisms, acousto-optic crystals, or electro-optic crystals. Pointing assemblies that use electro-optic or acousto-optic crystals are not well suited to large beams due to the cost of the crystals and active materials.

Further, beam steering prisms, such as rotating prism pairs with two or three prisms, also known as Risley prisms, have been used in conventional pointing assemblies. Using prism pairs in optics is difficult since control is complex. Thus, such solutions often require three prisms and multiple control loops involving an infinite number of solutions.

Figure 3:
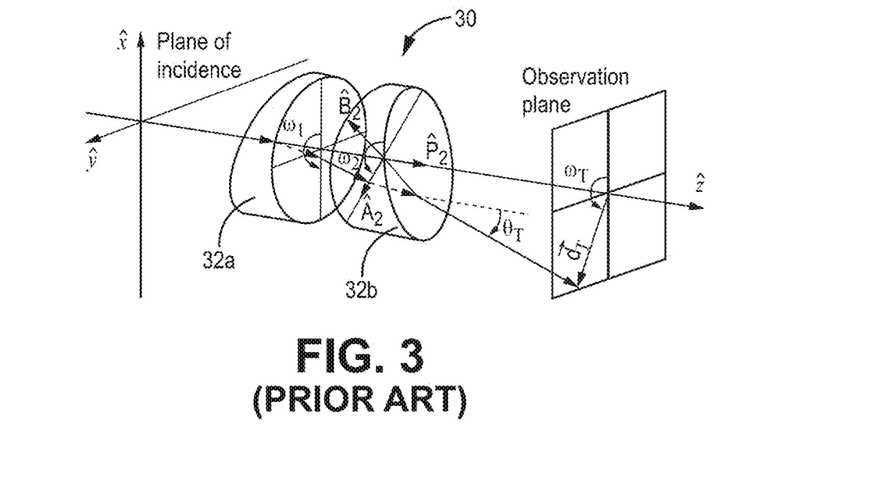
FIG. 3 illustrates a prior art transmission pointing assembly using a Risley prism pair.

An example implementation of a conventional transmission pointing assembly 30 that uses beam steering prisms is shown in FIG. 3. The pointing assembly 30 is implemented with a Risley prism pair 32a, 32b to provide for beam steering.

Other known beam steering mechanisms, such as moving a light source in the focal plane of a lens, or a mirror mounted on a single pivot point in the back of the mirror, tend to work better for small beam and/or small displacement angles, or are based on specific light properties (polarization, wavelength) that limit the type of optical modulation format that can be used.

SUMMARY

An apparatus for optical pointing is described herein. The apparatus comprises a telescope, a transmission prism rotatably coupled to the telescope, and a rotatable mechanism operatively coupled to the telescope. The transmission prism is configured to rotate around a first rotation axis, and the rotatable mechanism is configured to rotate around a second rotation axis that is different than the first rotation axis.

BRIEF DESCRIPTION OF THE DRAWINGS

Features of the present disclosure will be apparent to those skilled in the art from the following description with reference to the drawings. Understanding that the drawings depict only typical embodiments and are not therefore to be considered limiting in scope, the embodiments will be described with additional specificity and detail through the use of the drawings, in which.

DETAILED DESCRIPTION

In the following detailed description, reference is made to the accompanying drawings, in which is shown by way of illustration various exemplary embodiments. As will be apparent to those of ordinary skill in the art, these exemplary embodiments may be reconfigured without departing from the scope of the present disclosure. Thus, the exemplary embodiments may include optional features that one of ordinary skill in the art should recognize as not being a requisite to fall within the scope of the present disclosure. The following detailed description is, therefore, not to be taken in a limiting sense.

Various embodiments of an optical pointing apparatus, which can be implemented in a prism-based coarse pointing arrangement, are described herein. In one embodiment, the present apparatus can be implemented as a compact optical pointing apparatus having a full telescope mounted on a rotatable mechanism, such as a "lazy Susan" type rotating plate or other rotating mechanism, arranged around an optical axis of rotation of the telescope. The telescope has a suitably designed optical layout and folding mirror arrangement, with a single rotating transmission prism to provide elevation control. In this embodiment, a fine steering mechanism is fixed, as the telescope and transmission prism are rotated around an azimuth rotation axis aligned with an entrance optical axis of the fine steering mechanism.

In the prism-based coarse pointing arrangement disclosed herein, it is easier to reject the sun rays from the optical train of the telescope, by coating the prism with an appropriate solar rejection filter. Additionally, it is also easier to provide protection from contamination since all optical pieces in the coarse pointing arrangement can be encased.

The present optical pointing apparatus is particularly suited for use in a coarse pointing arrangement of an Optical Inter-Satellite Link (OISL) system, or in other optical free space communication systems. For example, the telescope, the transmission prism, and the rotatable mechanism can be part of an OISL terminal.

Further details of various embodiments are described hereafter with reference to the drawings.

Figure 4:
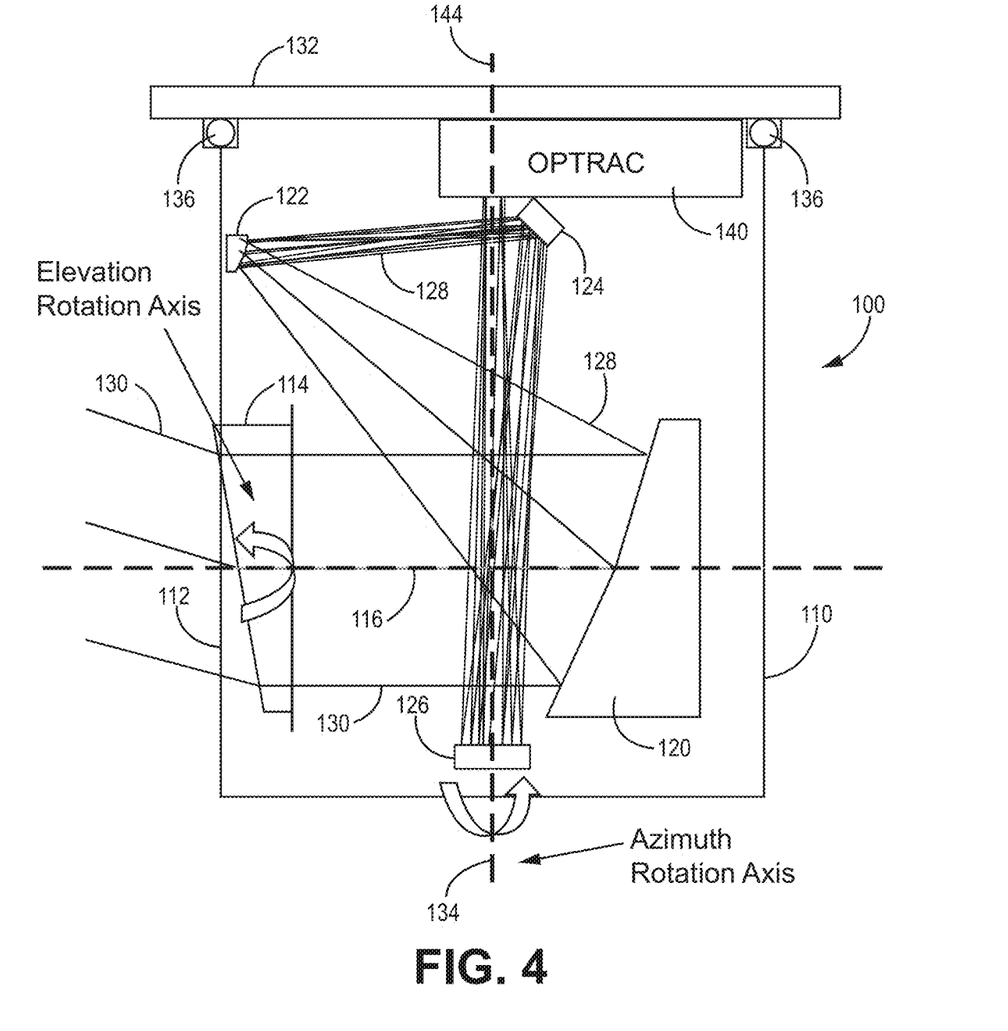
FIG. 4 is a schematic diagram of an exemplary optical pointing apparatus for a coarse pointing arrangement.

FIG. 4 illustrates an exemplary optical pointing apparatus 100 for a coarse pointing arrangement, according to one embodiment. While the embodiment described herein is based on a three mirror anastigmat telescope design, other telescope designs with fewer or more mirrors are possible without departing from the scope of the present disclosure.

The optical pointing apparatus 100 includes a telescope housing 110 having an optical aperture 112. A transmission prism 114 is rotatably coupled to telescope housing 110 within optical aperture 112. The transmission prism 114 is configured to rotate around a first rotation axis 116, such as an elevation rotation axis to provide elevation control. Such rotation can be provided by way of bearings, actuators, or other mechanisms. The first rotation axis 116 extends along a first direction through optical aperture 112 of telescope housing 110.

In one embodiment, transmission prism 114 can include a single wedge prism composed of a single prism material. In other embodiments, transmission prism 114 can include a doublet wedge prism composed of two different prism materials. Further details regarding the composition and properties of suitable prism materials are described hereafter.

A set of mirrors, including a primary mirror 120, a secondary mirror 122, a third mirror 126, and a folding mirror 124, are arranged within telescope housing 110 to provide a folded optical path 128 for a light beam 130 propagating in telescope housing 110.

The telescope housing 110 is mounted on a plate 132, which allows telescope housing 110 to be rotated around a second rotation axis 134. Such rotation can be provided by way of bearings, actuators, or other mechanisms, which provide an azimuth rotation axis, to provide azimuth control. For example, as shown in FIG. 4, a ball bearing ring 136 connects telescope housing 110 to plate 132 to provide the azimuth rotation axis. In another embodiment, plate 132 can be a "lazy Susan" type rotating plate, configured to rotate around the azimuth rotation axis, in which case there would be no need for ball bearing ring 136. The second rotation axis 134 extends along a second direction that is substantially perpendicular to first rotation axis 116 along the first direction.

A fine steering mechanism 140, such as an optical tracking (OPTRAC) assembly, can be mounted to plate 132. The second rotation axis 134 (azimuth rotation axis) is aligned with an entrance optical axis 144 of fine steering mechanism 140. The telescope housing 110 rotates around second rotation axis 134, but plate 132 and fine tracking mechanism 140 do not move.

The optical pointing apparatus 100 offers a built-in demultiplication on the elevation rotation axis, thereby lowering the requirement for precision motion encoders (e.g., 180 degree rotation of the prism provides a 30 degree elevation=6× demultiplication). Furthermore, an implemented control loop for optical pointing apparatus 100 can be deterministic (i.e., only two solutions can easily be calculated for both rotation angles of telescope housing 110 and transmission prism 114 given a target azimuth/elevation for beam 130 as compared to conventional Risley prisms pairs, which can have degenerate cases with large rotation swings around a boresight and inaccessible target angles in some cases).

Figure 5A:
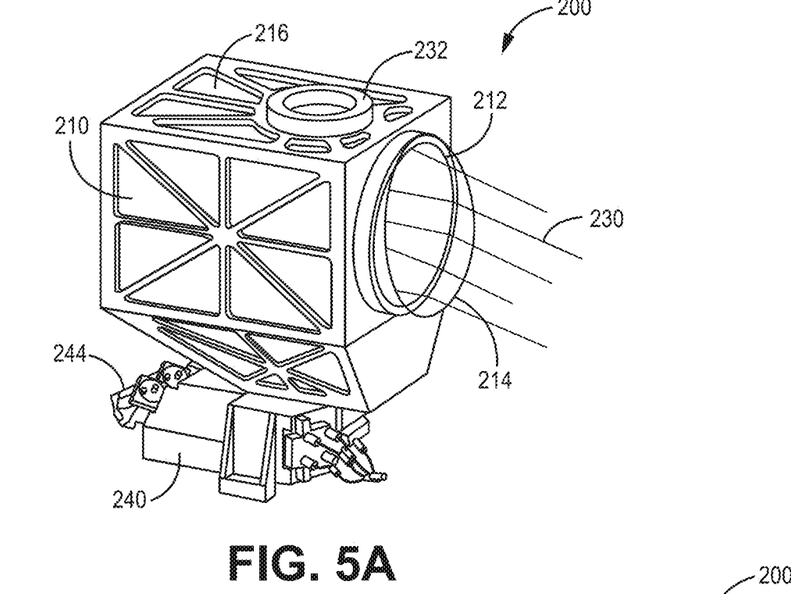
FIG. 5A is an external perspective view of an optical pointing apparatus, according to one embodiment.
Figure 5B:
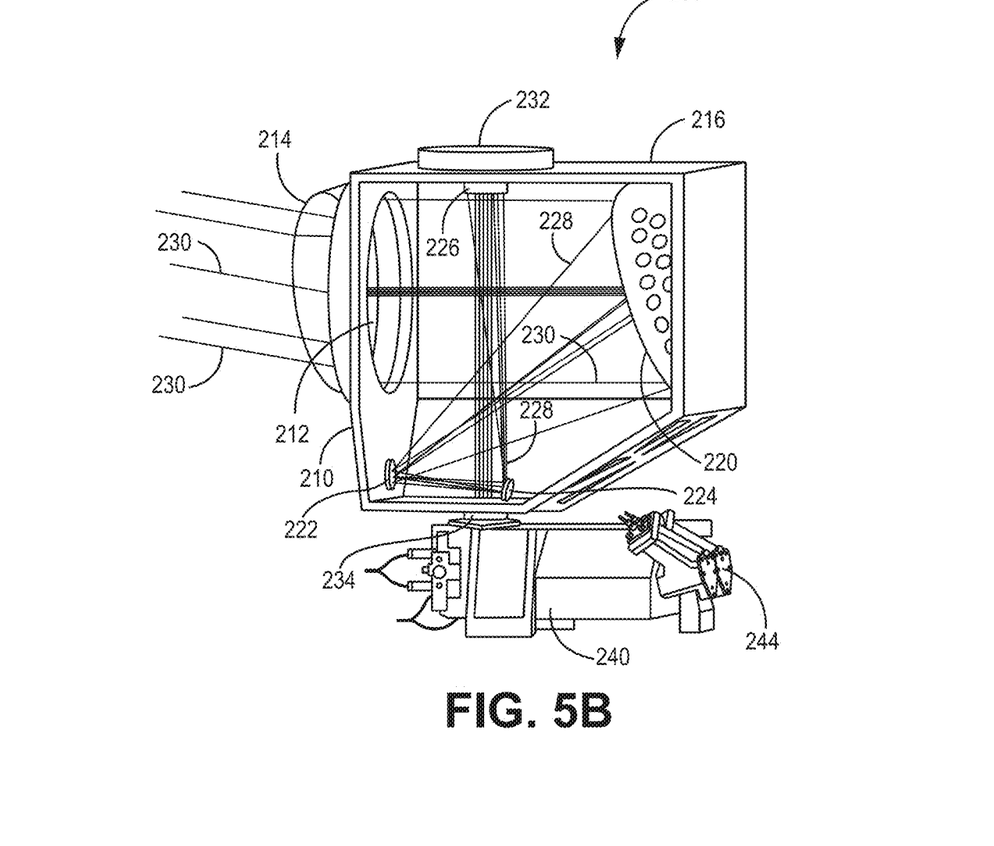
FIG. 5B is an internal perspective view of the optical pointing apparatus of FIG. 5A.

FIGS. 5A and 5B illustrate an optical pointing apparatus 200, according to one example embodiment. The optical pointing apparatus 200 includes a telescope housing 210 having an optical aperture 212. A transmission prism 214 is rotatably coupled to telescope housing 210 within optical aperture 212. The transmission prism 214 is configured to rotate around an elevation rotation axis to provide elevation control. The elevation rotation axis extends along a first direction through optical aperture 212 of telescope housing 210.

In one embodiment, transmission prism 214 can include a single circular wedge-shaped prism composed of a single prism material. In other embodiments, transmission prism 214 can include a doublet circular wedge-shaped prism composed of two different prism materials. As mentioned previously, further details regarding suitable prism materials are described hereafter.

As shown in FIG. 5B, a folding mirror arrangement is located within telescope housing 210, and includes a primary mirror 220, a secondary mirror 222, a tertiary mirror 226, and a folding mirror 224. The folding mirror arrangement is configured to provide a folded optical path 228 for light beams 230 propagating in telescope housing 210.

The telescope housing 210 is mountable to a plate (not shown), through a first azimuth rotation bearing 232 coupled to a top side 216 of telescope housing 210. The bearing 232 enables telescope housing 210 to be rotated around an azimuth rotation axis to provide azimuth control. The azimuth rotation axis extends along a second direction that is substantially perpendicular to the elevation rotation axis along the first direction through optical aperture 212. In one embodiment, the plate can be a "lazy Susan" type rotating plate, configured to rotate around the azimuth rotation axis, in which case there would be no need for bearing 232.

A fine steering mechanism 240, such as a fine tracking assembly, is mounted externally with respect to telescope housing 210. The azimuth rotation axis is aligned with an entrance optical axis of fine steering mechanism 240. A second azimuth rotation bearing 234 (FIG. 5B) joins fine steering mechanism 240 and telescope housing 210. In addition, a set of optical fiber couplers 244 are coupled to fine steering mechanism 240 and are operative to provide optical communications between fine steering mechanism 240 and external electro-optical transceiver devices (not shown). In this embodiment, fine steering mechanism 240 is fixed in place, as telescope housing 210 and transmission prism 214 are rotated around the azimuth rotation axis, provided by azimuth bearings 232 and 234.

The optical pointing apparatus 200 enables a much more compact Optical Head Unit (OHU) as compared to a periscope-style 2D gimbal mirror based Coarse Pointing Assembly (CPA) (e.g., a total height of 26 cm compared to 48 cm, and volume reduced by a factor of more than 8.5×). This requires a slight modification to the optical train (from 3 mirrors to 4 mirrors—three mirror anastigmat plus a folding mirror) to create a rotation axis in the collimated space around the OPTRAC.

Figure 6A:
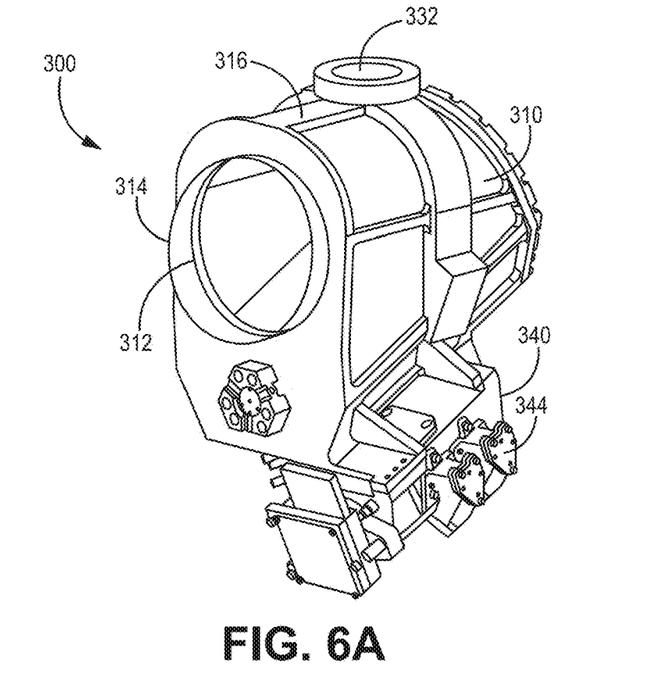
FIG. 6A is an external perspective view of an optical pointing apparatus, according to another embodiment.
Figure 6B:
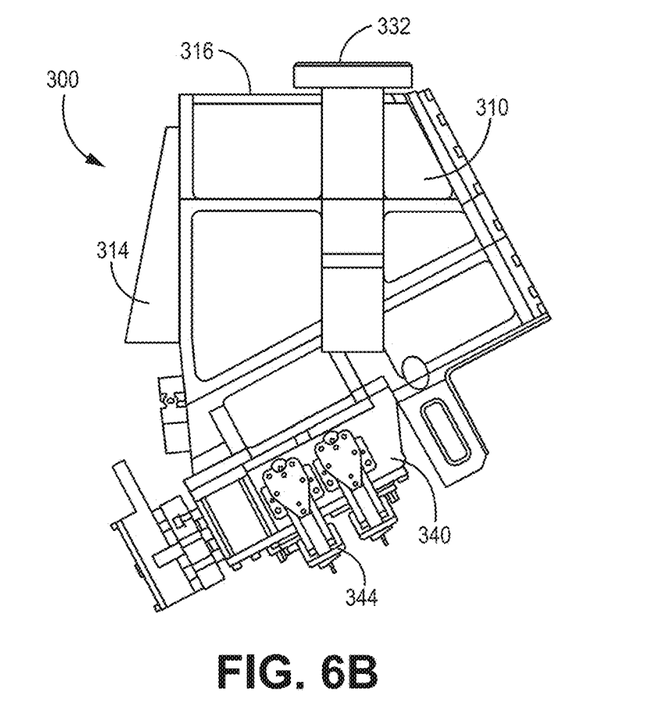
FIG. 6B is a side elevation view of the optical pointing apparatus of FIG. 6A.

FIGS. 6A and 6B illustrate an optical pointing apparatus 300, according to another example embodiment. The optical pointing apparatus 300 includes a telescope housing 310 having an optical aperture 312. A transmission prism 314 is rotatably coupled to telescope housing 310 within optical aperture 312. The transmission prism 314 is configured to rotate around an elevation rotation axis to provide elevation control. The elevation rotation axis extends along a first direction through optical aperture 312 of telescope housing 310.

In one embodiment, transmission prism 314 can include a single circular wedge-shaped prism composed of a single prism material. In other embodiments, transmission prism 314 can include a doublet circular wedge-shaped prism composed of two different prism materials. As mentioned previously, further details regarding suitable prism materials are described hereafter.

The telescope housing 310 is mountable to a plate (not shown), through an azimuth rotation bearing 332 coupled to a top portion 316 of telescope housing 310. The rotation bearing 332 enables telescope housing 310 to be rotated around an azimuth rotation axis to provide azimuth control. The azimuth rotation axis extends along a second direction that is substantially perpendicular to the elevation rotation axis along the first direction through optical aperture 312. In one embodiment, the plate can be a "lazy Susan" type rotating plate, configured to rotate around the azimuth rotation axis, in which case there would be no need for bearing 332.

A fine steering mechanism 340, such as a fine tracking assembly, is mounted externally to telescope housing 310. In addition, a set of optical fiber couplers 344 are coupled to fine steering mechanism 340 and are operative to provide optical communications with fine steering mechanism 340. In this embodiment, fine steering mechanism 340, telescope housing 310, and transmission prism 314 are all rotated around the azimuth rotation axis by the plate.

This embodiment is slightly less compact than the embodiment shown in FIGS. 5A-5B, which can be implemented with a fixed OPTRAC, but has a lower risk in terms of mechanical integrity since the OPTRAC is solidly attached to the telescope. However, since the OPTRAC is now rotating with the telescope, the optical fiber and all electric cables controlling the fine steering mechanism will move during operation, requiring extra care in terms of cable management.

In the above embodiments, the combination of a rotating transmission prism for elevation control, with bulk rotation of a telescope for azimuth control, responds to unique requirements. These include the inherent asymmetry in the elevation/azimuth range requirement, unique to OISL systems, and present unique challenges of using prisms combined with a rotating stage (chromatic aberrations, temperature dependence of the elevation angle, and coupled elevation/azimuth mechanisms).

In the case of optical free space communication links, if different wavelengths are used for optical transmission in the egress direction versus the ingress direction, an extra fine steering mirror can advantageously be used in conjunction with the present embodiments to make sure that both ray paths are parallel and aligned. Such an extra fine steering mirror is usually provided for OISL devices to compensate for point-ahead angle deviations caused by the extreme relative velocity between communicating satellites. Therefore, the same point-ahead module can be used for both point-ahead correction and dispersion correction through the prism.

Figure 7:
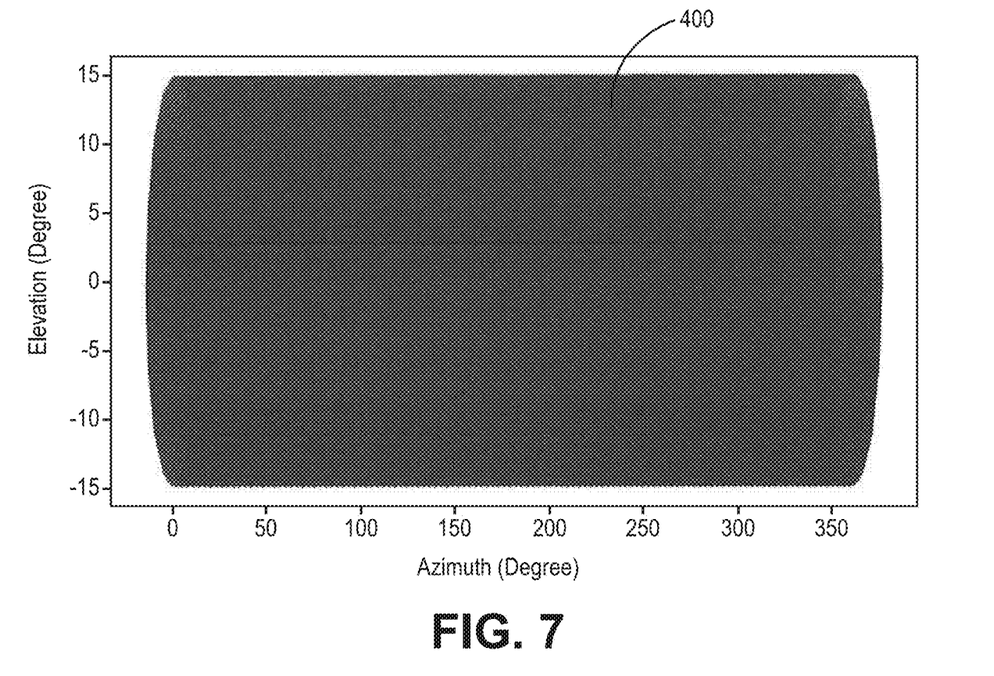
FIG. 7 is a graphical representation of an addressable field of regard, with respect to elevation and azimuth, using a wedge based prism coarse pointing arrangement.

FIG. 7 is a graphical representation of an addressable Field of Regard 400, with respect to elevation and azimuth, using an optical pointing apparatus having a wedge based prism coarse pointing arrangement, such as those described above. FIG. 7 shows that all angles within the Field of Regard are addressable with proper choice of azimuth and prism rotation angles. There is no inaccessible area as would be the case with a Risley prism pair. FIG. 7 also shows that there exists a deterministic relationship between the target elevation and azimuth angle, and the required prism rotation and azimuth rotation.

As mentioned previously, the above embodiments can employ a single wedge prism composed of a single prism material. For example, the prism material can be a high refractive index transparent material at a wavelength of interest. Non-limiting examples of such prism materials include silicon (Si), zinc selenide (ZnSe), zinc sulfide (ZnS), thallium bromide-iodide (KRS5), or similar high refractive index materials. In some embodiments, the prism material can be composed of a mid-infrared (mid-IR) material, which is well suited for transmission at about 1,550 nanometers.

Figure 8:
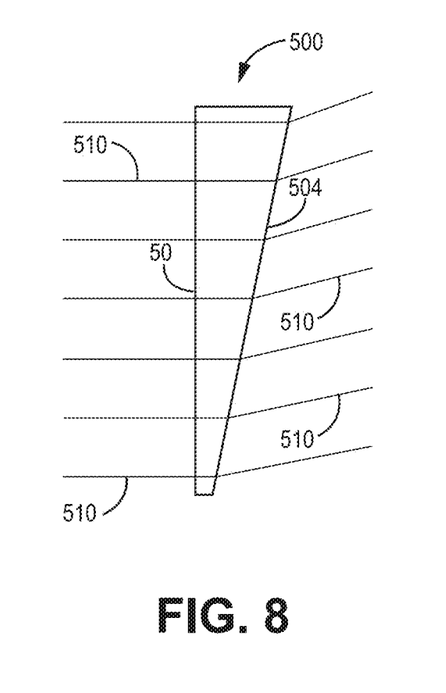
FIG. 8 is a schematic side view of a single wedge prism design, for use in a coarse pointing arrangement, according to one embodiment.

FIG. 8 is a schematic side view of a design for a single wedge prism 500, according to an example embodiment, for use in an optical pointing apparatus such as described previously. The single wedge prism 500 has a first side 502 and an opposing second side 504 that is angled with respect to first side 502. The single wedge prism 500 is configured such that incident rays of a light beam 510 passing through first side 502 are refracted at a given angle when exiting through second side 504. In one example embodiment, single wedge prism 500 can be composed of zinc sulfide.

Table 1 below lists various properties for an exemplary wedge prism made of zinc sulfide, such as single wedge prism 500, for use in a coarse pointing arrangement. Table 1 also shows how pointing accuracy can be impacted by temperature and operating wavelength when these are deviating from design values.

TABLE 1

| Single Prism | Temp (C. °) | Point Angle (deg) | Error (µrad) | Wavelength (µm) | Point Angle (deg) | Error (µrad) |
|---|---|---|---|---|---|---|
| ZnS | 15 | 14.9975 | −43.6 | 1.545 | 15.0012 | 20.9 |
| Volume (cm³): 123.4 | 20 | 15.0000 | 0.0 | 1.550 | 15.0000 | 0.0 |
| Weight (gram): 504.8 | 25 | 15.0025 | 43.6 | 1.555 | 14.9988 | −20.8 |

If an application of the present embodiments requires multi-wavelength operation, such as used in dense wavelength division multiplexing operations, a compound prism made of dissimilar materials can be used in the present embodiments to achromatize the prism design. For example, an achromat doublet wedge prism that minimizes dispersion can be made with properly chosen prism materials, like ZnS/ZnSe, which exhibit dissimilar wavelength dependency so as to cancel the overall chromaticity of the compound wedge prism. The achromat doublet wedge prism can be composed of two different prism materials that have a substantially matched coefficient of thermal expansion. Additionally, athermal operations can be achieved with an athermal doublet wedge prism, which is made from a suitable combination of two prism materials with dissimilar refractive index dependence on temperature. Furthermore, an achromat and athermal doublet wedge prism that minimizes both dispersion and thermal dependency can be implemented, such as a silicon/ZnS doublet wedge prism. These compound prisms are actuated in a coarse pointing arrangement such that both prism elements rotate simultaneously around the elevation rotation axis.

Figure 9:
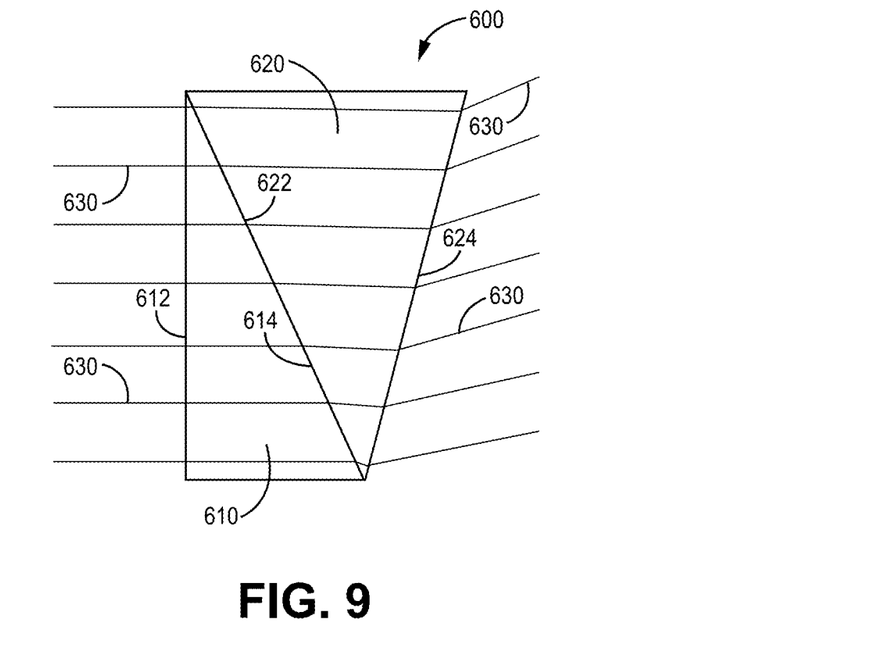
FIG. 9 is a schematic side view of an achromatic doublet wedge prism design, for use in a coarse pointing arrangement, according to another embodiment.

FIG. 9 is a schematic side view of a design for an achromatic doublet wedge prism 600, according to another example embodiment, for use in an optical pointing apparatus such as described previously. The doublet wedge prism 600 has a first wedge prism element 610 and a second wedge prism element 620 that is adjoined with first wedge prism element 610. The first wedge prism element 610 has a first side 612 and an opposing second side 614 that is angled with respect to first side 612. The second wedge prism element 620 has a first side 622 and an opposing second side 624 that is angled with respect to first side 622. The second side 614 of first wedge prism element 610 is adjoined with first side 622 of second wedge prism element 620.

The doublet wedge prism 600 is configured such that incident rays of a light beam 630 passing through first side 612 of first wedge prism element 610 are refracted at a given angle when exiting through second side 624 of second wedge prism element 620.

The doublet wedge prism 600 is made of two different prism materials that provide minimization of wavelength dependency of exit angle of beam 630. In one example embodiment, first wedge prism element 610 can be composed of zinc sulfide, and second wedge prism element 620 can be composed of zinc selenide.

Table 2 below lists various properties for an exemplary achromatic doublet wedge prism made of ZnS and ZnSe, such as doublet wedge prism 600, for use in a coarse pointing arrangement. As is evident in Table 2, the error due to wavelengths being far apart from the design wavelength of 1,550 nm is minimized as compared to the value obtained with a single material wedge prism as shown in Table 1 (about 20 times lower wavelength dependency). However, there is still a remaining temperature dependency.

A further advantage of the exemplary achromatic doublet wedge prism shown in Table 2, made with ZnS and ZnSe, is that both materials have a very closely matched coefficient of thermal expansion (respectively 6.6 ppm per degree and 7.1 ppm per degree). This enables direct attachment of both prism elements of the doublet prism to each other by use of an adhesive or optical contacting, with minimal thermal induced stress, and therefore does not require thermally relieved mounts to hold both prism elements.

TABLE 2

| Achromatic Doublet | Temp (C. °) | Point Angle (deg) | Error (µrad) | Wavelength (µm) | Point Angle (deg) | Error (µrad) |
|---|---|---|---|---|---|---|
| ZnS/ZnSe | 15 | 14.9990 | −16.9 | 1.545 | 15.0001 | 1.0 |
| | 20 | 15.0000 | 0.0 | 1.550 | 15.0000 | 0.0 |
| | 25 | 15.0010 | 16.9 | 1.555 | 14.9999 | −1.1 |

Figure 10:
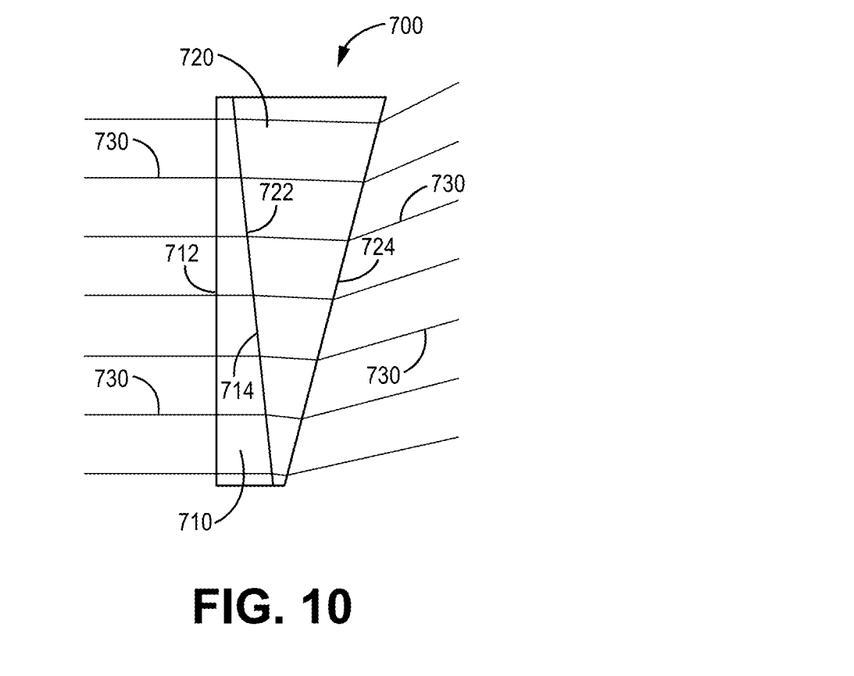
FIG. 10 is a schematic side view of an achromatic/athermal doublet wedge prism design, for use in a coarse pointing arrangement, according to a further embodiment.

FIG. 10 is a schematic side view of a design for an achromatic and athermal doublet wedge prism 700, according to a further example embodiment, for use in an optical pointing apparatus such as described previously. The doublet wedge prism 700 has a first wedge prism element 710 and a second wedge prism element 720 that is adjoined with first wedge prism element 710. The first wedge prism element 710 has a first side 712 and an opposing second side 714 that is angled with respect to first side 712. The second wedge prism element 720 has a first side 722 and an opposing second side 724 that is angled with respect to first side 722. The second side 714 of first wedge prism element 710 is adjoined with first side 722 of second wedge prism element 720.

The doublet wedge prism 700 is configured such that incident rays of a light beam 730 passing through first side 712 of first wedge prism element 710 are refracted at a given angle when exiting through second side 724 of second wedge prism element 720.

The doublet wedge prism 700 is made of two different prism materials that provide for minimizing both dispersion and thermal dependency. In one example embodiment, first wedge prism element 710 can be composed of silicon, and second wedge prism element 720 can be composed of zinc sulfide.

Table 3 below lists various properties for an exemplary achromatic and athermal doublet wedge prism made of Si and ZnS, such as doublet wedge prism 700, for use in a coarse pointing arrangement. As compared to the single material wedge prism as shown in Table 1, the achromatic and athermal doublet wedge prism exhibits simultaneously about 50 times lower thermal dependency and about 7 times lower wavelength dependency.

TABLE 3

| Achromatic/ Athermal Doublet | Temp (C. °) | Point Angle (deg) | Error (µrad) | Wavelength (µm) | Point Angle (deg) | Error (µrad) |
|---|---|---|---|---|---|---|
| Si/ZnS | 15 | 15.0000 | −0.8 | 1.545 | 14.9998 | −3.1 |
| | 20 | 15.0000 | 0.0 | 1.550 | 15.0000 | 0.0 |
| | 25 | 15.0000 | 0.9 | 1.555 | 15.0002 | 3.0 |

The specific examples provided herein relate to an optical pointing apparatus, however, the materials, methods of application, and arrangements described herein can be varied. For example, while one application has been described with respect to an OISL, the optical pointing apparatus can have other applications, such as within aircraft or for earth observation. Furthermore, other variants can exist in the axis that is rotated. While the present description has been made with respect to the elevation and azimuth axes, these axes are used only as a reference point, and one skilled in the art will appreciate that other axes or angles can be considered, and that these axes do not need to be perpendicular to each other.

Example Embodiments

Example 1 includes an apparatus for optical pointing, the apparatus comprising: a telescope; a transmission prism rotatably coupled to the telescope, wherein the transmission prism is configured to rotate around a first rotation axis; and a rotatable mechanism operatively coupled to the telescope, wherein the rotatable mechanism is configured to rotate around a second rotation axis that is different than the first rotation axis.

Example 2 includes the apparatus of Example 1, further comprising a folding mirror arrangement within the telescope, the folding mirror arrangement configured to provide a folded optical path for a light beam propagating in the telescope.

Example 3 includes the apparatus of any of Examples 1-2, wherein the second rotation axis is substantially perpendicular to the first rotation axis.

Example 4 includes the apparatus of any of Examples 1-3, wherein the transmission prism comprises a single wedge prism.

Example 5 includes the apparatus of any of Examples 1-3, wherein the transmission prism comprises an achromatic doublet wedge prism.

Example 6 includes the apparatus of Example 5, wherein the achromatic doublet wedge prism is composed of two different prism materials that have a substantially matched coefficient of thermal expansion.

Example 7 includes the apparatus of any of Examples 5-6, wherein the achromatic doublet wedge prism comprises a first prism element composed of zinc sulfide, and a second prism element composed of zinc selenide.

Example 8 includes the apparatus of any of Examples 1-3, wherein the transmission prism comprises an athermal doublet wedge prism.

Example 9 includes the apparatus of any of Examples 1-3, wherein the transmission prism comprises an achromatic and athermal doublet wedge prism.

Example 10 includes the apparatus of Example 9, wherein the achromatic and athermal doublet wedge prism comprises a first prism element composed of silicon, and a second prism element composed of zinc sulfide.

Example 11 includes the apparatus of any of Examples 1-10, further comprising a telescope housing, wherein the rotatable mechanism is operatively coupled to the telescope housing with a rotation bearing.

Example 12 includes the apparatus of any of Examples 1-11, further comprising a fine steering mechanism mounted external to the telescope.

Example 13 includes the apparatus of Example 12, wherein the second rotation axis is aligned with an entrance optical axis of the fine steering mechanism.

Example 14 includes the apparatus of Example 12, wherein the fine steering mechanism is fixed in place, as the telescope and the transmission prism are rotated around the second rotation axis by the rotatable mechanism.

Example 15 includes the apparatus of Example 12, wherein the fine steering mechanism, the telescope, and the transmission prism are rotated around the second rotation axis by the rotatable mechanism.

Example 16 includes the apparatus of any of Examples 12-15, further comprising a set of optical fiber couplers operative to provide optical communications with the fine steering mechanism.

Example 17 includes the apparatus of any of Examples 1-16, wherein the telescope, the transmission prism, and the rotatable mechanism are part of an Optical Inter-Satellite Links (OISL) terminal.

Example 18 includes the apparatus of Example 17, wherein the telescope, the transmission prism, and the rotatable mechanism are part of a coarse pointing arrangement in the OISL terminal.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. An apparatus for optical pointing, the apparatus comprising:
   a telescope;
   a transmission prism rotatably coupled to the telescope, wherein the transmission prism is configured to rotate around a first rotation axis;
   a rotatable mechanism operatively coupled to the telescope, wherein the rotatable mechanism is configured to rotate around a second rotation axis that is different than the first rotation axis; and
   a set of mirrors comprising a primary mirror and a secondary mirror arranged within the telescope, and a folding mirror configured to provide a folded optical path for a light beam propagating through the telescope.

2. The apparatus of claim 1, further comprising a third mirror optically arranged within the telescope with the primary and secondary mirrors.

3. The apparatus of claim 1, wherein the second rotation axis is substantially perpendicular to the first rotation axis.

4. The apparatus of claim 1, wherein the transmission prism comprises a single wedge prism.

5. The apparatus of claim 1, wherein the transmission prism comprises an achromatic doublet wedge prism that includes a first achromatic wedge prism element, and a second achromatic wedge prism element that is adjoined with the first achromatic wedge prism element.

6. The apparatus of claim 5, wherein the achromatic doublet wedge prism is composed of two different prism materials that have a substantially matched coefficient of thermal expansion.

7. The apparatus of claim 5, wherein the first achromatic wedge prism element is composed of zinc sulfide, and the second achromatic wedge prism element is composed of zinc selenide.

8. The apparatus of claim 1, wherein the transmission prism comprises an athermal doublet wedge prism that includes a first athermal wedge prism element, and a second athermal wedge prism element that is adjoined with the first athermal wedge prism element.

9. The apparatus of claim 1, wherein the transmission prism comprises an achromatic/athermal doublet wedge prism that includes an achromatic wedge prism element, and an athermal wedge prism element that is adjoined with the achromatic wedge prism element.

10. The apparatus of claim 9, wherein the achromatic wedge prism element is composed of silicon, and the athermal wedge prism element is composed of zinc sulfide.

11. The apparatus of claim 1, further comprising a telescope housing, wherein the rotatable mechanism is operatively coupled to the telescope housing with a rotation bearing.

12. The apparatus of claim 1, further comprising a fine steering mechanism mounted external to the telescope.

13. The apparatus of claim 12, wherein the second rotation axis is aligned with an entrance optical axis of the fine steering mechanism.

14. The apparatus of claim 12, wherein the fine steering mechanism is fixed in place, as the telescope and the transmission prism are rotated around the second rotation axis by the rotatable mechanism.

15. The apparatus of claim 12, wherein the fine steering mechanism, the telescope, and the transmission prism are rotated around the second rotation axis by the rotatable mechanism.

16. The apparatus of claim 12, further comprising a set of optical fiber couplers operative to provide optical communications with the fine steering mechanism.

17. The apparatus of claim 1, wherein the telescope, the transmission prism, and the rotatable mechanism are part of an Optical Inter-Satellite Links (OISL) terminal.

18. The apparatus of claim 17, wherein the telescope, the transmission prism, and the rotatable mechanism are part of a coarse pointing arrangement in the OISL terminal.

19. An apparatus for optical pointing, the apparatus comprising:
- a telescope;
- a transmission prism rotatably coupled to the telescope, wherein the transmission prism is configured to rotate around a first rotation axis; and
- a rotatable mechanism operatively coupled to the telescope, wherein the rotatable mechanism is configured to rotate around a second rotation axis that is different than the first rotation axis;
- wherein the transmission prism comprises:
  - an achromatic doublet wedge prism that includes a first achromatic wedge prism element, and a second achromatic wedge prism element that is adjoined with the first achromatic wedge prism element; or
  - an athermal doublet wedge prism that includes a first athermal wedge prism element, and a second athermal wedge prism element that is adjoined with the first athermal wedge prism element.

20. An apparatus for optical pointing, the apparatus comprising:
- a telescope;
- a transmission prism rotatably coupled to the telescope, wherein the transmission prism is configured to rotate around a first rotation axis; and
- a rotatable mechanism operatively coupled to the telescope, wherein the rotatable mechanism is configured to rotate around a second rotation axis that is different than the first rotation axis;
- wherein the transmission prism comprises an achromatic/athermal doublet wedge prism that includes an achromatic wedge prism element, and an athermal wedge prism element that is adjoined with the achromatic wedge prism element.

\* \* \* \* \*